United States Patent Office 3,449,244
Patented June 10, 1969

3,449,244
RECOVERY OF STEAM CONDENSATE
Harris A. Clay and Gene K. Reinmuth, Bartlesville, Okla., assignors to Phillips Petroleum Company, a corporation of Delaware
Filed Sept. 11, 1964, Ser. No. 395,882
Int. Cl. B01d 11/04
U.S. Cl. 210—21      6 Claims

ABSTRACT OF THE DISCLOSURE

The purification of steam condensate by contacting said condensate with a $C_3$–$C_8$ hydrocarbon to selectively dissolve hydrocarbon impurities, forming a water phase and a hydrocarbon phase, separating the water phase from the hydrocarbon phase and, as may be desired, recycling the hydrocarbon phase. The separated water phase is further purified by steam stripping any residual hydrocarbon therefrom.

---

Figure 1:
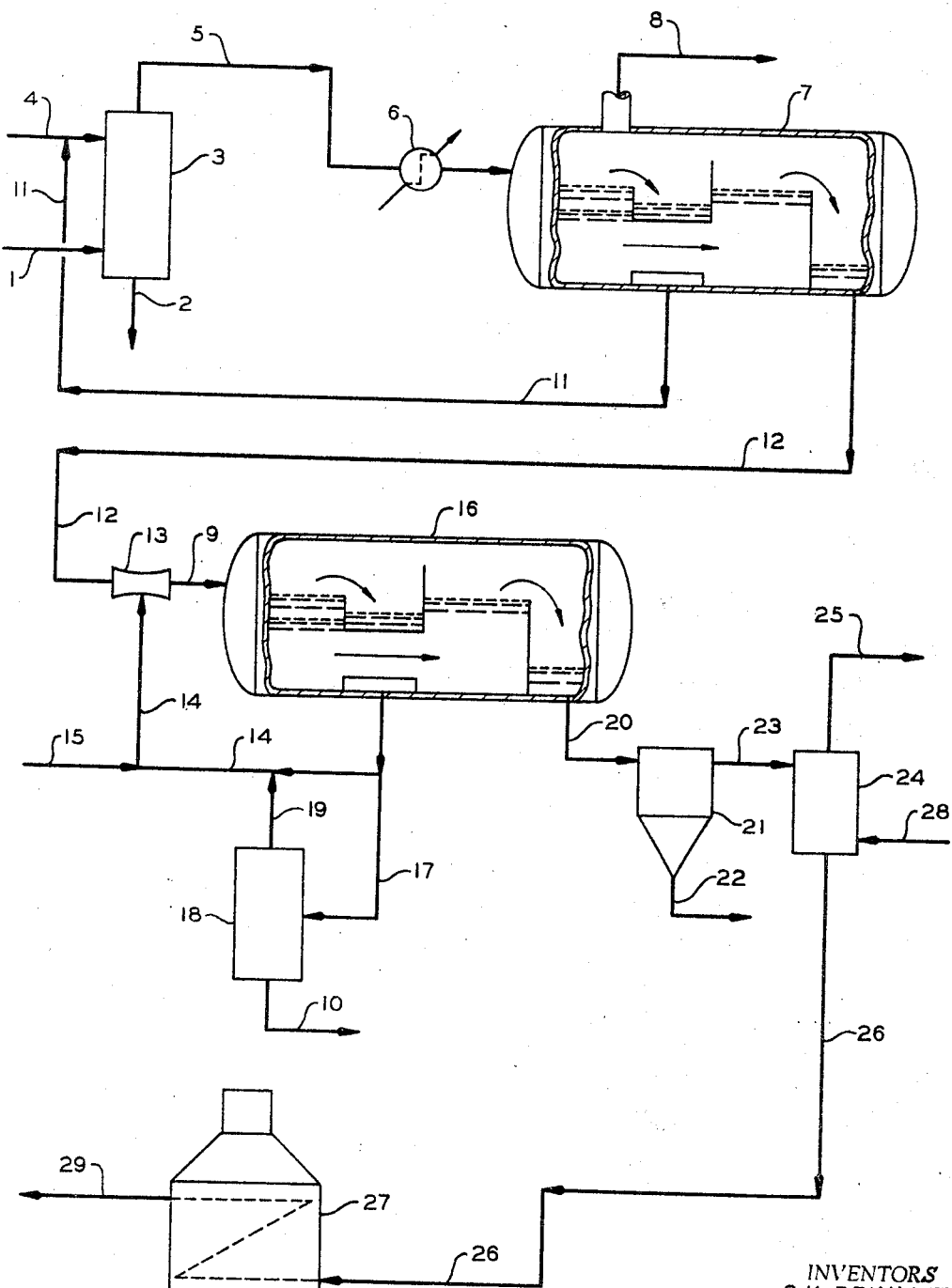

The invention relates to a process for removing impurities from steam condensate resulting from the steam used in the dehydrogenation of butene to butadiene comprising passing a mixture of steam and hydrocarbon from a dehydrogenation process to an oil quench step, quenching said mixtures of steam and hydrocarbon, removing steam quenched but still vaporous with the hydrocarbon product, condensing said steam in said mixture, separating said steam now condensed, from said hydrocarbon product, contacting said steam condensate with a hydrocarbon capable of forming a phase separable from water, dissolving oil impurities contained in said condensate into said hydrocarbon, separating said condensate from said hydrocarbon phase, and recycling said condensate.

In a more specific aspect, the condensate, after being separated from said hydrocarbon phase, and before recycling, is further purified by passing said condensate to a liquid-solid separator, removing solids therefrom, passing said condensate to a venting operation and therein removing remaining light hydrocarbons and other volatile materials.

In a still further aspect a portion of the hydrocarbon phase which is separated from the steam condensate is purified by passing it to a deoiler, removing dissolved oils therefrom, admixing the purified hydrocarbon phase with the remainder of said hydrocarbon phase, and recycling the hydrocarbon phase.

In another aspect, the invention relates to an apparatus for carrying out the method of this invention comprising means for admixing and contacting an aqueous phase containing an oily impurity with a solvent for said oily impurity, means for separating said aqueous phase from said solvent phase containing said oily impurities, means for removing said solvent phase from said separation means, and means for returning said solvent phase to said contacting means. In a still further aspect of the invention there is provided means for removing a portion of said solvent phase from said separation means and means for removing said oily impurities from said solvent phase, means for passing deoiled solvent phase from said means for removing oily impurities to contacting means.

In a still further aspect of the invention, there is provided means for removing said aqueous phase from said separator and means for passing said aqueous phase to a liquid-solid separator, means for separating liquids from solids in the aqueous phase, and means for passing the liquid thus separated to means for venting volatile impurities.

In another aspect the invention relates to an apparatus for contacting a low boiling liquid hydrocarbon phase with an aqueous phase containing an oil impurity comprising a unitary shell with an inlet and outlet area, a means for introducing hydrocarbon into the bottom of the shell in the inlet side thereof, a means for introducing the aqueous phase near the middle portion of the shell and above said means for introducing the hydrocarbon into the shell, means for separating an inlet from an outlet area, said means comprising a baffle plate extending to the sides of the vessel and upwardly into but not through a phase formed by said hydrocarbon and extending downwardly in, but not to the bottom of the vessel, means for removing the aqueous phase from the bottom of the vessel opposite the side of the baffle plate from which the aqueous phase and the hydrocarbon are introduced into the shell, and means for removing from the shell and means for deoiling said light hydrocarbon phase, and means for returning said light hydrocarbon phase to said means for introducing said phase into the shell.

In a dehydrogenation process such as disclosed and claimed in U.S. Patent No. 3,113,164, the hot dehydrogenated hydrocarbon stream is quenched after leaving the dehydrogenation reactor. In this process, dehydrogenated product mixed with steam diluent is fed into a quench vessel wherein the mixture is cooled but not condensed. Some of the oil used in the quench step is carried off with the gaseous mixture of dehydrogenated hydrocarbon and steam. The steam, the oil, and the dehydrogenated hydrocarbon are separated, the dehydrogenated hydrocarbon is further processed to recover butadiene therefrom, the water can be recycled back to the steam generators and the oil can be recycled back to the quench process. The steam thus separated from the hydrocarbon and oil is in the form of condensate which is frequently contaminated with small amounts of oil which make the condensate unsuitable for boiler feed water and other industrial purposes such as process water in chemical plants. The oil contained in the condensate can result from the quench oils and/or from generation of same in the dehydrogenation reaction. In addition to the oils, the condensate can contain floating and suspended solids, dissolved gases, and can be acidic or basic. In some instances the oil is in the form of emulsion which can be particularly difficult to remove if the density of the oil approaches that of water. If these impurities, in concentrations of several hundred parts per million, are not removed, they cause scaling of surfaces in boiler tubes, corrosion and pitting of surfaces, and render the water generally unsuitable for reuse.

We have discovered that these impurities can be substantially eliminated by contacting the oil-contaminated water with a solvent such as a hydrocarbon which has a density sufficiently different from that of water so that the solvent and the water can be readily separated, dissolving the oil impurities therein, forming a solvent phase and a water phase, separating the solvent phase from the water phase, passing the water phase to a solids separator, removing the solids from the water phase, then passing the water phase to a deaerator where residual volatile materials are removed, and passing the purified water to a desired use. We have further discovered that a portion of the solvent phase from the separation process can be passed to a deoiler wherein the oil impurities are removed and then the purified solvent can be admixed with the remainder of the solvent phase for contacting with the impure water.

Accordingly, it is an object of this invention to provide a method for removing minor amounts of oily impurities from an aqueous phase, such as steam condensate.

Further, it is an object of this invention to provide a method for removing oily impurities from steam condensate by means of a selective solvent, liquid-liquid separation process.

A further object of this invention is to remove solids and residual volatile materials from the purified steam condensate.

A still further object of this invention is to provide a method for treating a dehydrogenated effluent by quenching the same, and separating the dehydrogenated product from steam contained therein by the condensation of the steam and removing any oily impurities from the resulting steam condensate.

A still further object of this invention is to provide an apparatus for the process of this invention.

Other aspects, objects and the several advantages of the invention are apparent to one skilled in the art from a consideration of the disclosure, the drawing, and the appended claims.

In accordance with the invention, there is provided a method and apparatus for removing oily impurities from an aqueous phase or steam condensate by contacting said condensate with a solvent or low boiling liquid hydrocarbon which will dissolve the oily impurities and form a separate phase from that of the aqueous phase or condensate, and separating the liquid hydrocarbon phase and the water phase therein formed.

Figure 2:
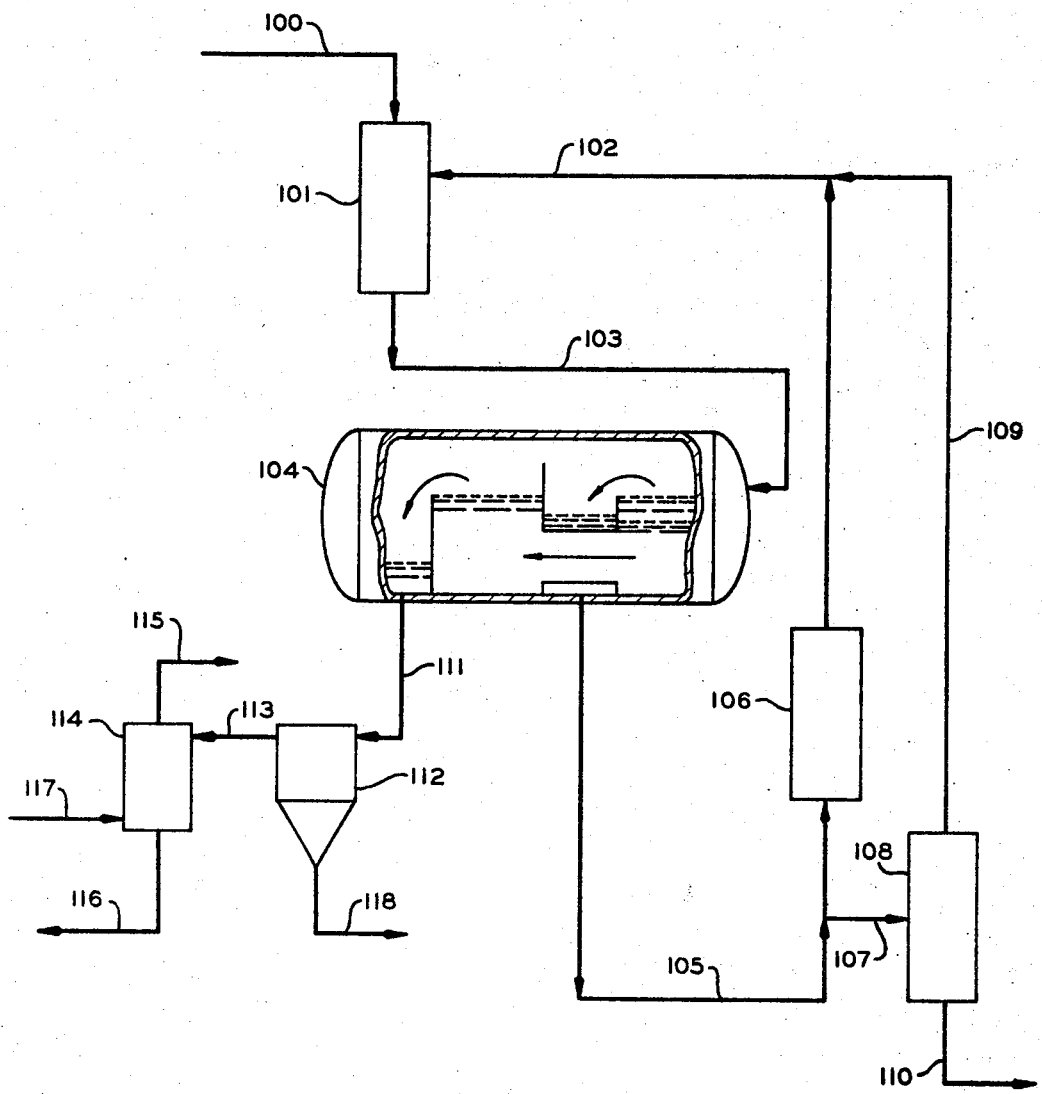
Figure 3:
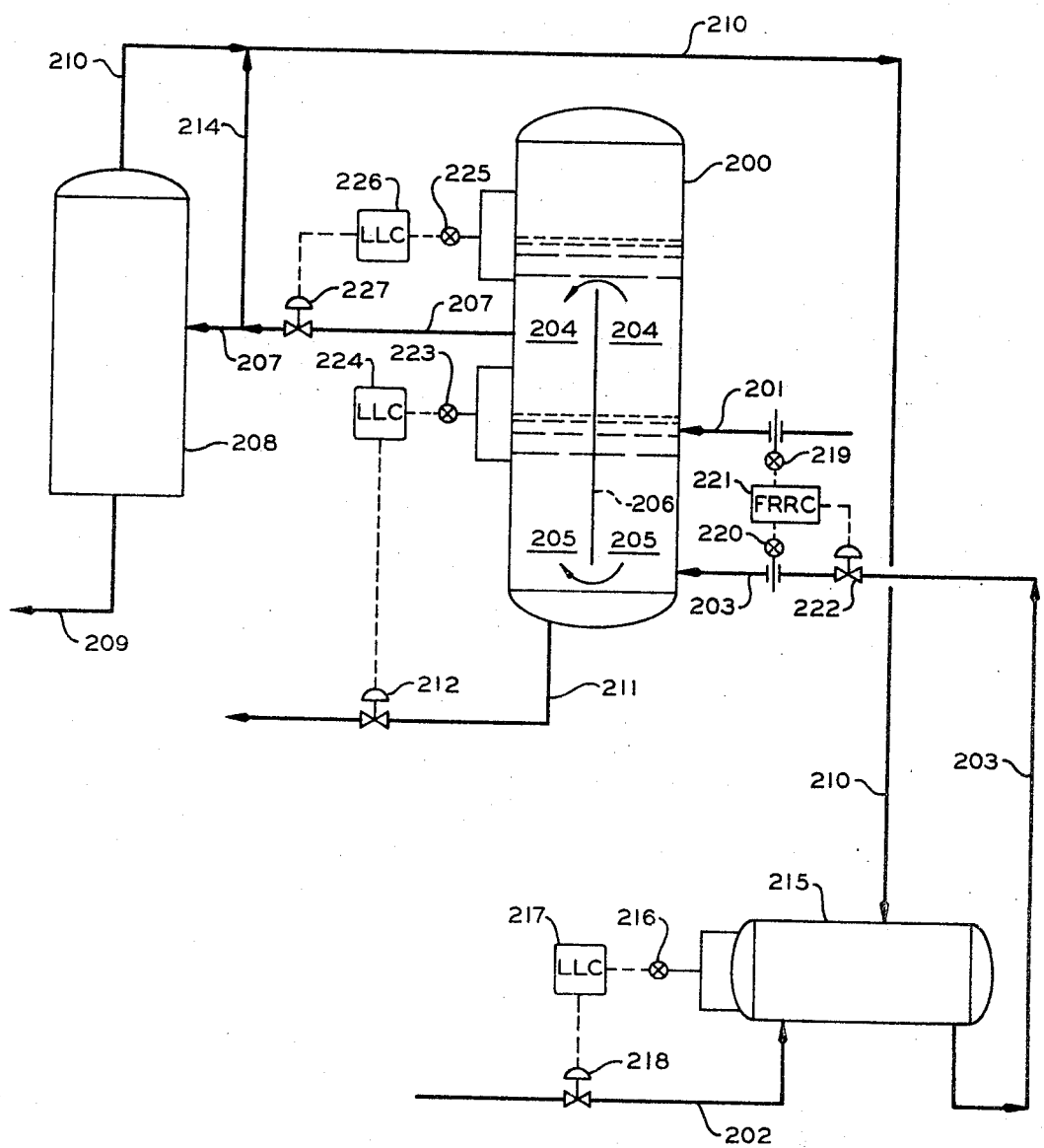

Our invention is illustrated with reference to the drawings wherein, for purposes of illustration, it being understood that this invention is not limited thereto, FIGURE 1 is a diagrammatical arrangement of the oil quench, the vapor-oil-water separation, and the hydrocarbon-water separation. FIGURE 2 shows an embodiment of the invention whereby the low boiling liquid hydrocarbon is contacted with the steam condensate. FIGURE 3 shows an apparatus for carrying out the invention.

In FIGURE 1, stream 1 consisting of dehydrogenated hydrocarbon mixed with steam enters oil quench tank 3 wherein it is quenched by contact with oil added through line 4. The heated oil is removed from quench tank 3 by line 2 and may be used as a heat source as desired before recycling as quench oil, line 4. The quenched dehydrogenated stream mixed with steam and some vaporized oil passes out of the quench tank 3 through line 5, condenser 6 and into separator 7, wherein the steam and oil now in liquid form, are separated from the dehydrogenated vaporous stream which passes out of the vapor-liquids separator through line 8. The separator may be any suitable separator in which two liquids and a vapor may be separated. An example of such a separator can be found in U.S. Patent No. 2,826,306. Here in separator 7, most of the oily contaminant is separated from the steam condensate by skimming. Oil separated from the light hydrocarbons and heavier steam condensate is discharged from separator 7 through line 11 while the steam condensate containing minor amounts of oily impurities from the oil quench and the dehydrogenation process is discharged through line 12 into hydrocarbon contactor 13 wherein low boiling liquid hydrocarbon from line 14 contacts the steam condensate to dissolve the minor amounts of oily impurities. The contactor 13 could be any suitable apparatus which would allow the hydrocarbon to be contacted homogeneously with the steam condensate as, for example, a venturi mixer, a mixing pump, a spray contactor, a packed contactor, a tray contactor, or the like. The hydrocarbon-contacted steam condensate pases via line 9 into phase separator 16 wherein the light hydrocarbon phase containing the oily impurities separates from the condensate phase. The oily impurities in the condensate will preferentially dissolve in the hydrocarbon phase because the oily impurities are highly soluble in the hydrocarbon whereas they are nearly insoluble in the steam condensate. If the density of the hydrocarbon phase is substantially different from that of water, an efficient separation of the hydrocarbon phase, containing oily impurities, from the condensate phase will be effected in separator 16. The hydrocarbon phase, thus separated from the steam condensate, can be returned to the contactor 13 through line 14. Makeup hydrocarbon can be added to the system through line 15. A portion of hydrocarbon stream 14 may be passed through line 17, deoiler 18, to remove the oily impurities as stream 10 by a distillation method, and the substantially oil-free hydrocarbon returned to line 14 through line 19. The water phase, substantially oil free, is removed from separator 16 through line 20, passed into solids separator 21, such as a cyclone vessel or a filter, wherein the solids are separated from the condensate and removed from the separator through line 22. The steam condensate is then passed through line 23 to deaerator 24 wherein residual hydrocarbon and other volatile materials are stripped from the condensate by steam added through line 28 and removed through line 25. The purified steam condensate then passes from line 26 through steam boiler 27 and back to the dehydrogenation process as steam to be reused for dehydrogenation diluent and/or for heating and power turbine uses via line 29.

Regulation of the levels of the several liquid phases in phase separation vessels 7 and 16 is, of course, necessary. While baffles within these vessels provide some regulation, automatic control procedures are needed for plant operation. In accord with prior art methods, the outflowing streams are restricted by process control valves which are automatically manipulated by conventional level controllers to maintain desired liquid levels. Level controlled pump-out of the baffle-separated vessel compartments may be accomplished by continuous flow regulation or if desired by an on-off control system operating from high and low level switches. In the case of vapor-liquid separator 7, the outflowing vapor stream may be variably restricted to maintain a desired pressure within the vessel.

FIGURE 2 shows in detail an embodiment of the hydrocarbon-condensate contacting method. In FIGURE 2 an aqueous phase such as steam condensate containing some oily impurities is passed through line 100 into contactor 101 wherein it is contacted with a solvent for the oily impurity via line 102. In the contactor 101, the aqueous phase is thoroughly admixed with the solvent from line 102. The solvent will preferentially dissolve the oily impurities which are present in a minor amount in the aqueous phase. The mixture is passed via line 103 into phase separator 104 wherein the solvent phase is separated from the aqueous phase. The solvent phase, containing the oil impurities from the aqueous phase, is passed from the phase separator 104 through line 105 and into surge vessel 106. A small stream may be taken from line 105 through line 107 into deoiler 108 so that the oily impurities can be removed via line 110. The solvent, thus purified, is passed from deoiler 108 through line 109 and into line 102 where it is admixed with the solvent from the surge tank 106. The oil-free aqueous phase is passed from separator 104 through line 111 into solids separator 112, wherein the solids are removed from the aqueous phase via line 118. The condensate then is passed through line 113 into the deaerator 114 wherein the residual hydrocarbons and other volatile impurities are removed by steam stripping through line 115 while the aqueous phase is passed from the deaerator 114 through line 116 to any desired application. Steam for deaerating and stripping the clean condensate is added via line 117.

In FIGURE 3 an aqueous phase, for example, steam condensate, is passed into contactor-phase separator 200 through line 201. In this contactor-phase separator, the steam condensate is contacted with a light hydrocarbon, added initially and later as needed via line 202 to surge vessel 215, which is passed into the contactor-phase separator through line 203. The light hydrocarbon phase passes upward in vessel 200, thereby counter-currently contacting the steam condensate which enters vessel 200 through line 201. The rising light hydrocarbon will dissolve the oil impurities contained in the steam condensate and carry them to the upper portion of the vessel 200 wherein a hydrocarbon-water phase separation takes place. The hydrocarbon phase is illustrated by 204 and the water or steam condensate phase is represented by 205. A baffle plate 206 prevents the steam condensate entering through 201 and the hydrocarbon phase entering at 203 from passing directly to the opposite side of the contactor where the purified, separated products are removed, but the light and heavy phases are passed over and under baffle 206 respectively to the effluent side of vessel 200. The light, separated hydrocarbon phase may be removed from the vessel 200 through line 207 and either recycled to the vessel through lines 214, 210 and 203, or as desired passed to a deoiler 208 or some combination of the two. The oil impurities separated as by fractional distillation pass from deoiler 208 through line 209 while the purified hydrocarbon passes from deoiler 208 through line 210 and into surge vessel 215. The purified steam condensate is removed from vessel 200 through line 211.

For automatic control purposes, surge tank 215 may be equipped with level transmitter 216 and level controller 217 to operate valve 218 in hydrocarbon makeup line 202 to supply hydrocarbon as required by the process. The volumetric rate-of-flow ratio of hydrocarbon feed in line 203 to the steam condensate feed in line 201 can be controlled by a system consisting of flow measuring elements and transmitters 219 and 220, flow ratio recorder controller 221 which operates valve 222 so that the desired flow ratio of hydrocarbon to condensate is maintained even though the condensate feed rate may vary. Flow ratios within the range of one volume of hydrocarbon to 20 volumes of water (1:20), to one volume of hydrocarbon per one volume of water (1:1) are operable if the two phases are well contacted and mixed in vessel 200 of FIGURE 3 or in venturi-mixers 13 and 101 of FIGURES 1 and 2. Choice of ratio is based upon the mixing characteristics of actual equipment, desire for very low oil concentration in the washed water and economic considerations of the process.

To maintain the desired inventory of washed steam condensate in sections 205 of vessel 200, an interfacial liquid level transmitter 223 supplies the measurement to liquid level controller 224 which operates valve 212 in line 211 to regulate effluent flow to maintain the desired interfacial level. Similarly, the hydrocarbon liquid level is measured by transmitter 225 and controlled by liquid level controller 226 via manipulation of valve 227 in line 207, regulating hydrocarbon phase effluent flow from vessel 200. If it is desired to operate contactor-separator vessel 200 liquid full, the pressure within the vessel can be measured and controlled by manipulation of valve 227. Controls needed for allocation of feed and bypass to and around deoiler fractionator 208 can be selected from conventional systems and are not shown; nor are pumps and other conventional operating equipment shown for sake of brevity.

The hydrocarbon which contacts the steam condensate can be any hydrocarbon or hydrocarbon mixture which has a density sufficiently different from that of water and is substantially insoluble in water so that it will form a separate phase upon settling. In lieu of hydrocarbons, other solvents possessing the density and solubility characteristics above, such as carbon tetrachloride could be used. However, a solvent of greater density than water requires a different arrangement of the phase separators. Preferably, the solvent will be lighter than water. Normal and/or isobutane are the preferred hydrocarbons. Other suitable hydrocarbons include pentane, propane, cyclohexane, benzene, toluene, gasoline, naphtha, butylene, amylene, or any mixtures thereof.

As an example of one mode of operation of the inventive steam condensate treatment process of FIGURE 1, raw steam condensate stream 12 at a flow rate of 27,000 gallons per hour, containing about 220 parts per million of dissolved and entrained oil is contacted in venturi-mixer 13 with a normal butane stream 14 containing about 10 volume percent oil and flowing at a rate of about 6,000 gallons per hour (a flow rate of about 1.0 to 4.5). In separator 16 the hydrocarbon and aqueous phases separate, the aqueous phase containing about 4.4 parts per million oil is removed by line 20 to cyclone separator 21 wherein a very small concentration of solid material is removed by line 22, and the solids-free stream is passed by line 23 to deaerator 24 where it is heated and stripped by live steam added by line 28, the treated condensate containing about 1 part per million oil being removed by line 26 for boiler feed water use.

The oil-enriched butane stream withdrawn from separator 16 is, at least periodically, divided into two streams, the first of which recycles directly to venturi-mixer 13 as stream 14, the second of which enters deoiler-fractionator 18 as stream 17 wherein the butane is separated from the oil as by heat stripping. The level of oil concentration in the butane and the operational economic considerations dictate the choice of intermittent or continuous operation of the oil removal step and the flow rate thereto. Assuming a continuous oil removal operation, with 6,000 gallons per hour of hydrocarbon phase (10 percent oil) removing about 6 gallons per hour of oil from 27,000 gallons per hour of steam condensate, the oil concentration in the hydrocarbon phase rises from 10 to about 10.1 percent in the effluent from separator 16. About 59 gallons of effluent per hour is rerun in deoiler 18 for removal of the 6 gallons of oil per hour. About 53 gallons of the oil-free butane per hour is returned via stream 19 to line 14. Due to this minor volume of effluent from separator 16 to be processed, intermittent rerun for oil removal is preferred, with oil content of the hydrocarbon phase periodically rising to 12–15 percent during normal operation and being reduced to 2–8 percent as desired during the rerun operation. Butane losses, by virtue of solubility in the hot water and subsequent stripping in deaerator 24 and in stream 10 from deoiler 18, are of the order of 46 gallons per hour. Butane may be recovered from the overhead vapors from deaerator 24 by a condensing process or by an absorption or adsorption process.

Phase separator 16 is operated at about 180° F. and at a pressure of the vapor pressure of normal butane, i.e., about 155 pounds per square inch absolute. A skimming line can be added just below the controlled level of liquid in the water effluent section of separator 16 to prevent liquid butane, condensed from atmospheric cooling of the top of tank 16 from being lost in the separated water. This line may be connected to the point where inlet pipe 9 joins venturi-mixer 13 so that the injector-pumping action of venturi-mixer 13 may be utilized to recover and recirculate this condensed butane and prevent its ultimate loss in deaerator 24. Solids separator 21 operates at about 180° F. and moderate pressure, and deaerator 24 operates at temperatures and pressures corresponding to the boiling point of water such as 225° F. at 19 pounds per square inch absolute.

This invention can be used for purposes other than in the dehydrogenation process. For example, it can be used in purifying steam condensate used in the thermal cracking of light hydrocarbons. In such processes, the oil concentration can vary from a few to several hundred parts of oil per million parts of steam condensate.

A further example of the use of this invention is in the treatment of steam condensate formed in the dephlegmation step following the absorption and stripping steps of the conventional natural gasoline recovery process. In this case, the steam employed to strip the lower molecular weight components from the rich absorption oil is condensed and separated but is unavoidably contaminated with oil. Thus, removal of oil impurities, usually in the range of 200 to 1000 parts of oil per million parts of condensate is desirable before oil is reused.

This invention will find general use in the purification of industrial water which is discharged into streams, lakes, rivers and the like. In this application, an inexpensive solvent such as propane can be used to remove the oily impurities and air stripping can be employed to remove the solvent from the water.

We claim:

1. A method for purifying impure water obtained from an operation which includes the oil quenching of hydrocarbons which have been dehydrogenated and mixed with steam as in the production of a dehydrogenated product from butane, the steps which comprise contacting the impure water with a low boiling liquid hydrocarbon having from 3 to 8 carbon atoms per molecule, said hydrocarbon being a selective solvent for said oil and having a density sufficiently different from that of water to readily form a separate phase from that of the aqueous phase, gravitationally separating the resulting hydrocarbon phase from the resulting aqueous phase, passing the thus separated aqueous phase to a stripping zone, maintaining said stripping zone at a temperature corresponding substantially to the boiling point of water at the pressure in said stripping zone and contacting the thus separated aqueous phase in said stripping zone with steam under conditions to readily strip any residual amount of said hydrocarbon, and recovering from said stripping zone the thus purified water in a condition such that it can be reused to produce steam.

2. A method in accordance with claim 1 wherein said impure water is obtained from an operation for oil quenching products resulting from the dehydrogenation of butane wherein the dehydrogenated hydrocarbons thus obtained are mixed with steam and are quenched with oil, the steam and the dehydrogenated hydrocarbon are passed from the quench step to a separator wherein the dehydrogenated hydrocarbons are separated from the steam and the steam is condensed, forming an aqueous phase containing some oils as impurity and a dehydrogenated product phase separating said aqueous phase containing some oils as impurity, the thus separated aqueous phase containing some oils as impurity being said impure water.

3. A method in accordance with claim 1 wherein said hydrocarbon is propane.

4. A method in accordance with claim 1 wherein said hydrocarbon is butane.

5. A method in accordance with claim 1 further comprising passing at least a portion of the thus separated hydrocarbon phase through a deoiling zone for the removal of the oil impurities therefrom, admixing the thus deoiled hydrocarbon with any remaining portion of said thus separated hydrocarbon phase and recycling the resulting admixture to said step of contacting said impure water with said low boiling liquid hydrocarbon.

6. A method in accordance with claim 1 wherein said thus separated aqueous phase is passed through a liquid-solids separation zone for the separation of solids therefrom prior to being introduced into said stripping zone.

References Cited

UNITED STATES PATENTS

| | | | |
|---|---|---|---|
| 2,773,003 | 12/1956 | Brown et al. | 210—21 X |
| 3,217,049 | 11/1965 | Bonem | 210—21 X |
| 669,746 | 3/1901 | Garrigus | 210—512 X |
| 726,167 | 4/1903 | Johnson | 210—512 X |
| 1,920,565 | 8/1933 | Jones | 210—23 X |
| 1,955,065 | 4/1934 | Hawley | 210—21 |
| 2,361,780 | 10/1944 | Lewis | 210—21 X |
| 2,474,006 | 6/1949 | Maycock | 210—533 X |
| 2,855,362 | 10/1958 | Ratje et al. | 23—270.5 X |
| 2,906,791 | 9/1959 | Baumann et al. | 260—680 |
| 3,247,103 | 4/1966 | Shang | 210—21 |
| 3,259,568 | 7/1966 | Jordan et al. | 210—21 X |
| 3,306,849 | 2/1967 | Bozeman, et al. | 208—321 X |

REUBEN FRIEDMAN, *Primary Examiner.*

F. A. SPEAR, JR., *Assistant Examiner.*

U.S. Cl. X.R.

210—73, 83, 195, 259, 511, 512; 260—680, 683.3